(12) United States Patent
Sprigg et al.

(10) Patent No.: US 7,743,407 B2
(45) Date of Patent: *Jun. 22, 2010

(54) USING PERMISSIONS TO ALLOCATE DEVICE RESOURCES TO AN APPLICATION (75) Inventors: Stephen A. Sprigg, Poway, CA (US); Laurence Lundblade, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1102 days.

This patent is subject to a terminal disclaimer.

(21) Appl. No.: 10/218,321

(22) Filed: Aug. 13, 2002

(65) Prior Publication Data

US 2003/0051169 A1   Mar. 13, 2003

Related U.S. Application Data (60) Provisional application No. 60/312,146, filed on Aug. 13, 2001.

(51) Int. Cl.
*G06F 7/04* (2006.01)
*H04L 9/32* (2006.01)
*G06K 9/00* (2006.01)
*H04K 9/00* (2006.01)

(52) U.S. Cl. ............................ 726/4; 713/170; 713/193; 713/194; 380/249; 726/2; 726/3; 726/5; 726/6; 726/7; 726/27; 726/28; 726/29

(58) Field of Classification Search ...................... 726/4
See application file for complete search history.

(56) References Cited

U.S. PATENT DOCUMENTS 5,689,708 A   11/1997   Regnier et al.

(Continued)

FOREIGN PATENT DOCUMENTS

WO   01018650   3/2001

(Continued)

OTHER PUBLICATIONS

Senn, J.A. "The Emergence of M-Commerce" (Dec. 2000) Computer vol. 33 Issue 12. pp. 148-150. IEEE DOI: 10.1109/2.889097.*

(Continued)

*Primary Examiner*—Longbit Chai
(74) *Attorney, Agent, or Firm*—Robert J. O'Connell; James T. Hagler (57) ABSTRACT Resources to a device are granted access to an application based on privileges associated with the application. A permission list may be created by a server. The permission list may be created using information from authorities, entities, or parties and information about the device resources. The permission list indicates what device resources the application may access. During application execution when the application requests a resource, a control program executing on the device may be used to check the permission list associated with the application to determine if the application may access the resource. The control program can then grant or deny access based on the privileges defined in the permission list. Digital signatures may be used to detect modifications to the application and/or permission list. In addition, multiple permission lists may be associated with the same application.

11 Claims, 5 Drawing Sheets

U.S. PATENT DOCUMENTS

| | | | |
|---|---|---|---|
| 5,745,879 A | 4/1998 | Wyman | |
| 6,105,066 A | 8/2000 | Hayes, Jr. | |
| 6,125,447 A * | 9/2000 | Gong | 726/17 |
| 6,158,010 A | 12/2000 | Moriconi et al. | |
| 6,367,019 B1 * | 4/2002 | Ansell et al. | 726/26 |
| 6,468,160 B2 * | 10/2002 | Eliott | 463/43 |
| 6,857,071 B1 * | 2/2005 | Nakae | 713/156 |
| 6,874,087 B1 * | 3/2005 | Fetkovich et al. | 726/23 |
| 6,895,503 B2 * | 5/2005 | Tadayon et al. | 713/168 |

FOREIGN PATENT DOCUMENTS

| | | |
|---|---|---|
| WO | WO 01/18650 A2 * | 3/2001 |

OTHER PUBLICATIONS

K. Fujimura, Y. Nakajima, J. Sekine "XML Ticket: Generalized Digital Ticket Definition Language" (Mar. 1999) Presented at XML-DSig '99. Digital Copy available at http://www.w3.org/DSig/signed-XML99/pp/NTT_xml_ticket.html.*

Gong, L.: "Java Security Architecture (JDK1.2)," Dec. 6, 1998.

International Search Report-PCT/US02/025746, International Search Authority, European Patent Office-Dec. 6, 2002.

European Search Report-EP02761353, Search Authority Munich Nov. 29, 2007.

* cited by examiner

USING PERMISSIONS TO ALLOCATE DEVICE RESOURCES TO AN APPLICATION

CROSS-REFERENCE TO RELATED APPLICATION

This application claims the benefit of Provisional Application No. 60/312,146, filed Aug. 13, 2001, pending, which application is incorporated herein by reference in its entirety.

FIELD OF THE INVENTION

The present invention relates to processing of applications for use in a computer device, and more particularly, to the granting of device resources per application.

BACKGROUND

Wireless communication has experienced explosive growth in recent years. As consumers and businesses rely more on their wireless devices, such as mobile phones and personal digital assistants (PDAs), wireless service providers, i.e., carriers, strive to provide additional functionality on these wireless devices. This additional functionality will not only increase the demand for wireless devices but also increase the usage among current users.

The environment of a wireless device creates unique challenges when one considers the execution of application on a wireless device. Methods of downloading the applications and removing the applications need to be developed. In addition, there is a need for security on the wireless device. Security concerns on the wireless device include controlling the environment the best way possible so that an application cannot, intentionally or unintentionally, degrade or corrupt other files on the wireless device or the network on which the wireless device communicates.

Applications, during execution, require various resources on the device they are executing. These resources include memory (including primary and secondary storage), CPU time and/or access, I/O ports and particularly, the display, speakers, keyboard or keypad and a microphone. If the device is connected to a network, the application may also want to access a device resource to use the network, e.g., a dialer on the device.

It is desirable control the application's access to the device resources as a security measure to limit any damage an application may have on the device, or other devices connected to the device. This damage may be intended via a virus on the application or may be unintended where the application executes with poorly written code that unintentionally dominates a resource and makes it unavailable or damaged to other applications.

Currently, the method of controlling the resources of a device was based on a user privilege level. If the user was a typical user on the system, he or she was provided a level of access to the resources that was anticipated they would need. No matter what applications the user put on or executed on the device, as long as the applications were executing under those user privileges, those applications were all given the same access rights to the device.

If, for example, the user was a systems administrator or systems engineer on the network the device was connected, that user may be given a higher privilege level, e.g., a "super user," and given more access to the device and network resources. Similarly as with the typical user though, this super user's privileges remained the same across all the applications the super user executed. In this scenario, the same application executed by the typical user may be granted additional resources if executed by the super user.

However, this practice does not allow for the device to limit a device's resources per application. While the user itself may attempt to limit the application's access to resources, this provided no security to those maintaining the device and the network the device was located. The user could avoid limiting the resources and, therefore, damage the device resources or network resources based on the privilege levels defined to the user.

Consequently, what is needed in the art is a system and method for protecting the resources of a device and the connected network and also increasing the flexibility of managing the device's resources by allowing the granting rights to the resources per application.

SUMMARY OF THE INVENTION

Systems and methods consistent with the present invention overcome the shortcomings of existing systems by allowing an application access to a device's resources based on a set of permissions associated with the application.

In one embodiment, the present invention provides a method for storing an application on a device comprising the steps of receiving an application at the device, receiving a permission list at the device, wherein the permission list indicates a resource the application may access on the device and storing the application and permission list on the device.

In another embodiment, the present invention provides a method for allowing access to a device resource comprising the steps of receiving a request for the device resource from an application, evaluating a permission list associated with the application, wherein the permission list indicates the resources the application can access, and granting the application access to the device resource based on the indication in the permission list.

In yet another embodiment, the present invention provides a method for associating a permission list with an application comprising the steps of receiving an application, receiving at least one or more privilege rights associated with one or more device resources, wherein the privilege right indicates access to the associated device resource, and creating a permission list using the one or more privilege rights and a field associated with each of the one or more device resources, wherein, the permission list is associated with an application and is used to evaluate whether the application may access the one or more device resources.

Further embodiments of the present invention are also described in the following description and attached drawings.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention. In the drawings.

DETAILED DESCRIPTION OF THE PREFERRED EMBODIMENT

Reference will now be made in detail to the presently exemplary and preferred embodiments of the invention as illustrated in the accompanying drawings, in which like reference characters designate like or corresponding parts throughout the several drawings. The nature, objectives and advantages of the present invention will become more apparent to those skilled in the art after considering the following detailed description in connection with the accompanying drawings.

Introduction

Systems and methods consistent with the present invention limits an application's access to a device's resources on a computer device. While a privilege level may be defined to the user that limits access to the device's resources, systems and methods consistent with the present invention limit an application's access to the device's resources per application, thus providing increased flexibility and security in managing the device's resources. The device resources include all those components of the device that provides access to or performs a function. These include, but are not limited to, the device's memory, primary and secondary storage, Input/Output ("I/O") ports, network access, dialers, speakers, display, keyboard/keypad, microphones, files and resources whether on the device itself or located across a network that the device can access.

The present invention associates a permission list with the application. The developer of the application, system administrator, or other authority, such as a carrier or device manufacturer, may create or provide input to creating this permission list for the application when used on the device. In addition a server may be used to create the permission list based on the input from the authorities, entities or parties involved with executing the application on the device. When the application and permission list is installed on the device, the application when executed will only be allowed access to the resources granted in the permission list. It will be recognized by those skilled in the art that a device may further limit an applications access to resources outside of the permission list. For example, a user may not have rights to a resource on the device that the application is granted permission. This alternative embodiment of the present invention is that the device may provide an additional limitation and, consequently, refuse access to the resource even if the permission has been granted in the permission list based on other privilege levels associated with the device and/or user.

By associating the resources of a device to an application in a permission list, multiple permission lists may be created for use with the same application. Consequently, on different devices, different resources may be granted access to the same application.

It will be recognized to those skilled in the art that the forgoing describes an application file type being distributed and executed for simplicity of description. An "application" may also include files having executable content, such as: object code, scripts, java file, a bookmark file (or PQA files), WML scripts, byte code, and perl scripts. In addition, an "application" referred to herein, may also include files that are not executable in nature, such as documents that may need to be opened or other data files that need to be accessed.

Figure 1:
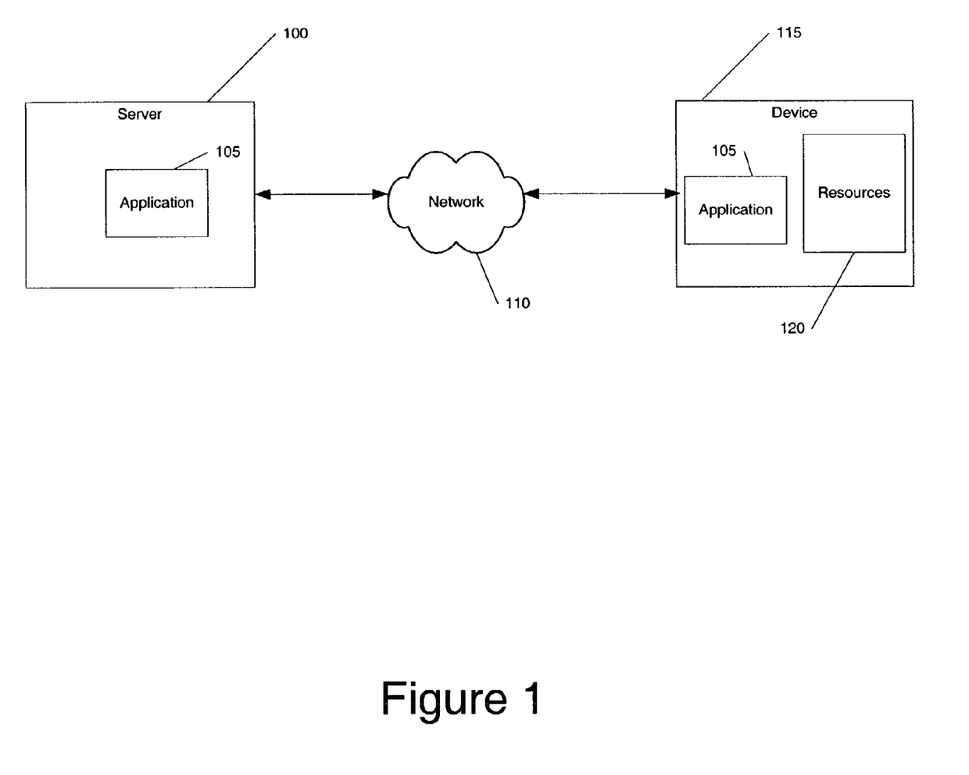
FIG. 1 is a block diagram depicting a system architecture environment in which an exemplary embodiment of the present invention may be practiced.

FIG. 1 is a block diagram depicting an system architecture environment in which an exemplary embodiment of the present invention may be practiced. A device 115 is capable of executing an application 105. The device 115 may be any computing device, such as a personal computer, a wireless device, including mobile and fixed wireless devices, a combination of computing devices connected together. The device 115 has resources 120 associated with the device 115. These resources include components of the device that provide a function or access to a function within or external to the device 115. Examples of a device's resources 120 include memory, including primary and secondary storage, a microphone, the network connected to the device, dialers to access other devices connected to the device, including those connected via the network, files stored in memory, including the read, write and modify operations on such files, I/O port, other components supported by the device, such as a Global Positioning Satellite ("GPS") function.

The application 105 is installed on the device via a network 110 or through some other installation mechanism, such as via a CD-ROM using a local drive or a file transfer from another computer via a direct connection. The application 105 will typically request the use of the device's resources 120. For example, if the application's 105 function is to dial other devices via a network, the application may request access to memory where the device's address or dialing numbers are located, it may also request access to the device's dialer to place a call to another device using the number received from memory.

A server 100 is one mechanism used by the present invention to transfer the application 105 to the device 115. A permission list (not shown) may be created by the server 100 and associated with the application 105 for use on the device 115. For secure transmission of the application, as well as any other data transfer, the server may incorporate a modification detection technique, such as a digital signature well known to those in the art. By using this technique, information, such as an application, can be check by the device to determine if it was modified prior to being received by the device. Furthermore, this checking can also occur before every execution of the application to determine if any modification occurred to the information even after being received by the device.

The network 110 may be any private or public network, such as a LAN and/or Internet. The network 110 may also be entirely or incorporate a wireless RF network. In addition, the network 110 may incorporate dedicated lines, a public switched telephone network and support data, voice, or any combination thereof.

Figure 2:
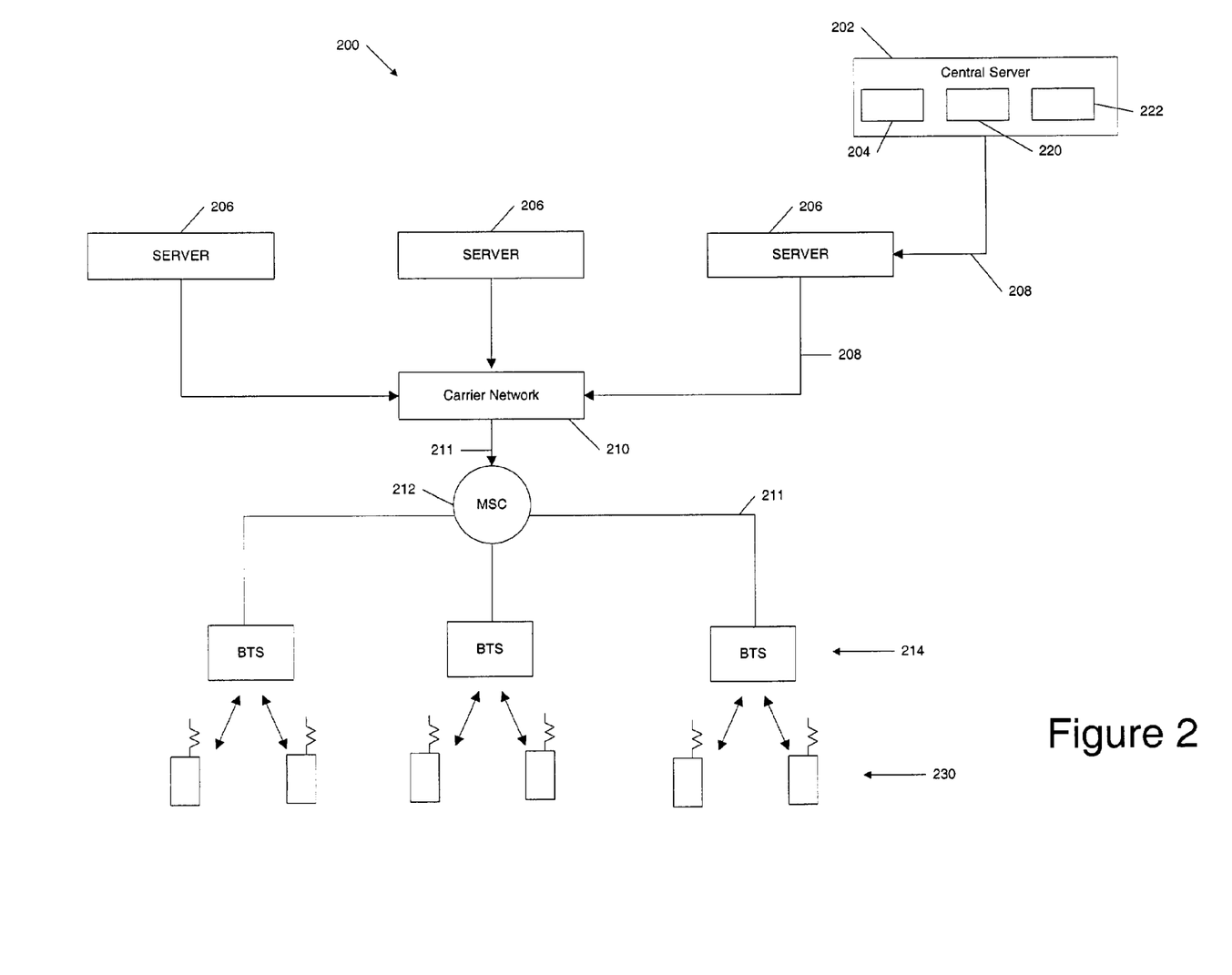
FIG. 2 is a block diagram depicting a wireless system architecture containing wireless devices having resources in an exemplary embodiment of the present invention.

FIG. 2 is a block diagram depicting a wireless system architecture containing wireless devices having resources in an exemplary embodiment of the present invention. A central server 202 is an entity that certifies, either by itself or in combination with a certification server, the application programs as compatible with a defined set of programming standards or conventions. As described earlier, these programming standards may be established so that the application will execute on a BREW™ software platform, developed by QUALCOMM Incorporated.

In one embodiment, the central server database 204 consists of a record of the identifications for each application program downloaded at any time onto each wireless device 230 in the network 200, an Electronic Service Number ("ESN") for the individual who downloaded the application program, and a Mobile Identification Number ("MIN")

unique to the wireless device 230 carrying that application program. Alternatively, the central server database 204 contains records for each wireless device 230 in the network 200 of the wireless device model, wireless network carrier, the region where the wireless device 230 is used, and any other information useful to identify which wireless device 230 are carrying which application programs. In addition, the central server database may also store this developer identifying information associated with an application.

The central server 202 communicates with one or more computer servers 206, over a network 208, such as the Internet (preferably secured). The servers 206 also communicate with a carrier network 210 via a network 208. The carrier network 210 communicates with the MSC 212 by both the Internet and POTS (plain ordinary telephone system) (collectively identified in FIG. 2 as 211). The Internet connection 211 between the carrier network 210 and the MSC 212 transfers data, and the POTS 211 transfers voice information. The MSC 212, in turn, is connected to multiple base stations ("BTS") 214. The MSC 212 is connected to the BTS by both the Internet 211 (for data transfer) and POTS 211 (for voice information). The BTS 214 sends messages wirelessly to the wireless devices 230 by short messaging service ("SMS"), or any other over-the-air method.

The above network may be used to send an application and/or permission list to a computer device, such as the wireless device 230. The application, in one embodiment, has a unique identifier to distinguish it from other applications. The application and permission list may incorporate a digital signature to detect modifications prior to receipt by the device, prior to executing the application, and prior to granting access to a resource to the application. This digital signature may be bound to the application and permission list and stored on the wireless device either bound or separate, but still associated with, the application and permission list. The application and permission list are sent to the wireless device from the central server to one of the various servers 206 through the MSC and BTS to the wireless devices 230.

Figure 3:
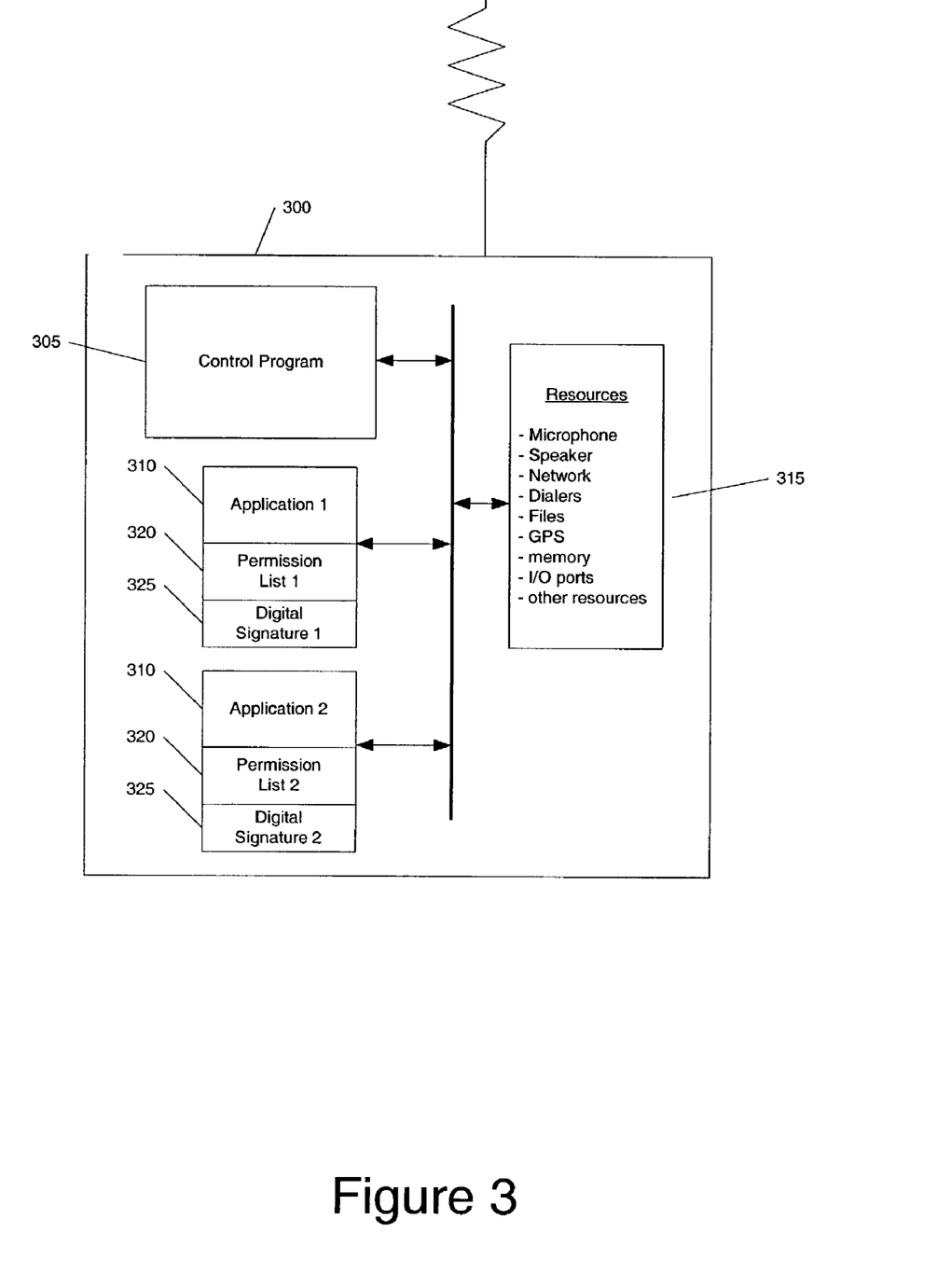
FIG. 3 is a block diagram depicting components of a wireless device in an exemplary embodiment of the present invention.

FIG. 3 is a block diagram depicting components of a wireless device in an exemplary embodiment of the present invention. A wireless device 300 contains a control program 305, applications 310 each with a permission list 320 and a digital signature 325 and resources 315. It will be recognized by those skilled in the art the applications 310 may perform different tasks. Furthermore, each application 110 may have a separate permission list associated with that application and a digital signature that will typically be unique for each application and permission list. It will also be recognized by those skilled in the art that the resources listed in 315 are examples of many device resources. There may be many resources associated with a device, including those outside of the device that the device may access, that access may be granted to an application based on the permission list.

In one embodiment, the control program 305 is located on the device to help manage access to the resources 315. The functions of the control program 305 may be incorporated into the operating system for the wireless device, or may be a separate API, such as the BREW™ API developed by QUALCOMM Incorporate. The control program 305 may grant or deny access of a resource to an application based on the privileges awarded to the application.

In one embodiment, these privileges are determined via a permission list 320 associated with the application. The permission list 320 contains a listing of the resources 315 and an indication whether the application has permission to access any of the specific resources 315 on the device. For example, the permission list 320 may contain a field for "microphone" and "speaker." The setting of a flag in each of the fields indicates whether the application has access to the microphone or speaker. In some instances, a flag set in the microphone field indicates that the application may access the microphone. In other instances, the flag may not be set thereby denying access. It is preferable to have as many resources as possible accounted for in the permission list and a flag associated with each one indicating whether the application has access to the associated resource or not.

The permission lists 320 may be created by a server and transmitted along with the application to the wireless device 300. The permission list may be created many ways, though, including by the application developer or intermediate authority. This allows the determination of the application's access to the device's resources by those authorities, entities, or parties that may be affected by the misuse of a device's resource. Consequently, a third party, such as a carrier, may control the access to the wireless device's resources by defining permissions associated with an application that will be executed by the wireless device and used on the carrier network.

The digital signatures 325 help determine if the application 310 and/or the permission list 320 was modified. The digital signature 325 may be created using the permission list, application, or combination thereof. It is preferable that digital signatures, or some other modification detection technique, be used. By detecting whether the permission list or application was modified, the device has a higher degree of confidence that no other process or application has intention or unintentionally, corrupted the application or permission list. This prevents the application from obtaining access to resources that it was not originally granted permission and increases reliable and safe execution of the application.

Figure 4:
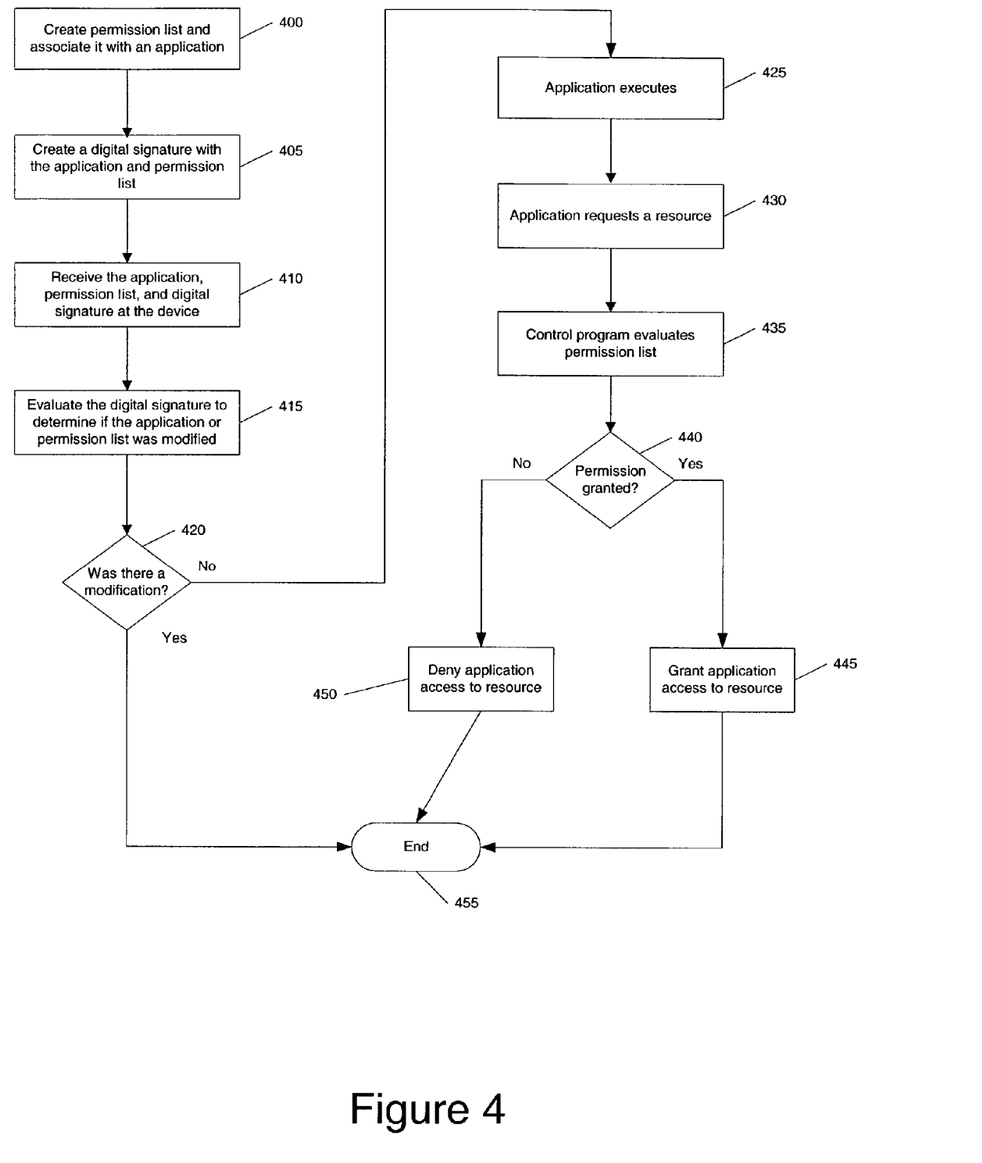
FIG. 4 is a flowchart depicting the process of executing an application having a permission list for resources on a device in an exemplary embodiment of the present invention.

FIG. 4 is a flowchart depicting the process of executing an application having a permission list for resources on a device in an exemplary embodiment of the present invention. A permission list is created and associated with an application (Step 400). In one embodiment, the permission list contains the fields of resources of a device on which the application will run. The fields contain flags that are set or not depending on whether the permission is granted to allow the application to access the resource associated with the field.

The permission list may be created based on input from the application developer. Also, it may be based on input from an authority that desires to approve the resource usage of the device. An authority, such as a carrier in a wireless network, may want to limit the extent of what an application may do on a network. By limiting the application's access to the device's resources, the authority has limited the extent to what an application can do.

A digital signature is then created using the application and permission list (Step 405). The use of digital signatures is well known to those skilled in the art; it allows for the detection of any modification to the files used to create the digital signature. While a digital signature is not necessary to implement one embodiment of the present invention, it is preferable that the digital signature be applied to both the application and the digital signature. This allows the device to check whether the application and the permission list were modified. If they were modified, the device may elect not to execute the application and thus prevent a corrupted application or permission list from accessing the device's resources.

Creating the permission list and the digital signature may be performed at a server prior to installing the application on the device.

The device then receives the application, permission list and the digital signature (Step 410). This may be performed by downloading this information from a network or by installing it directly onto the device using a file transfer from another computer directly connected to the device or by some other transfer mechanism, such as a CD-ROM via a local drive.

The device evaluates the digital signature against the permission list and the application to determine if there was a modification of the application prior to being received by the device (Step 415). In one embodiment, the control program executing on the device performs this evaluation.

If it is determined that the application and/or permission list was modified (Step 420), processing ends (Step 455). The device may perform any number of functions at this point, including removing the application and permission list, tagging it as corrupted data, and/or notifying the originator of the application and permission list that the application and/or permission list was modified and to initiate another installation.

If in Step 420 it is determined that no modification occurred, the application executes on the device (Step 425). This execution can occur as a result of an initiating request by a user or by the request of another application or process.

The application then requests a resource on the device (Step 430). In this embodiment, the application wants a resources on the device to perform a function. For example, the application may want to initiate a call on the wireless device and is requesting access to a dialer on the device.

The control program evaluates the permission list associated with the application. (Step 435). If the permission list indicates that the application has the privilege to access the requested resource (Step 440), the application will be granted access to the resource (Step 445). The process then ends (Step 455)

If the permission list indicates that the application does not have the privilege to access the requested resource in Step 440, then the request to access the resource is denied (Step 450). The process then ends (Step 455). Prior to ending, the device and/or control program can take several actions, including terminating executing of the application, allowing execution to continue but without access to the resource, and/or notifying the originator or other authority that the application has requested a resource and that it was denied.

Figure 5:
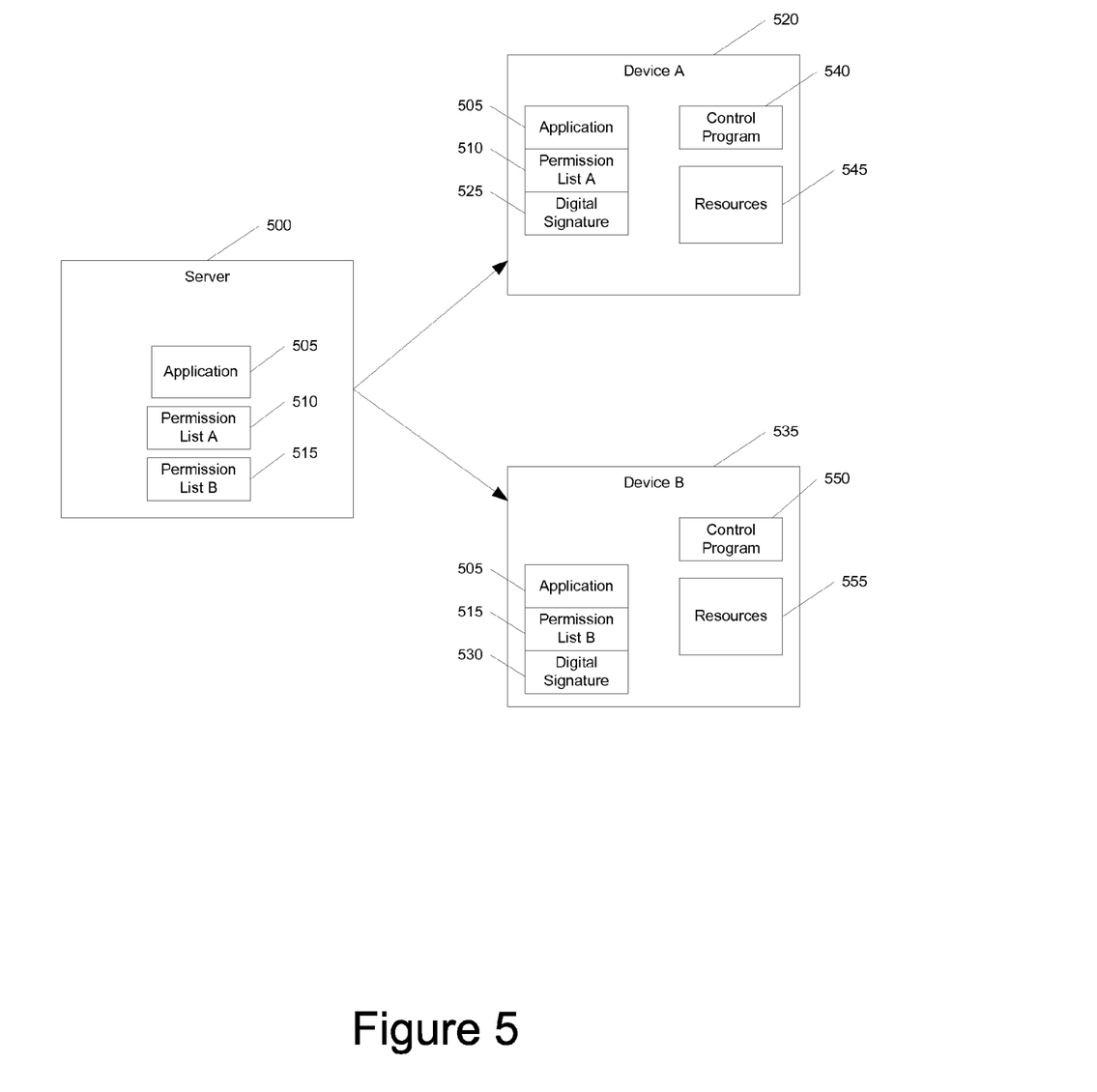
FIG. 5 is a block diagram depicting the ability to assign multiple permission list to the same application for different devices in an exemplary embodiment of the present invention.

FIG. 5 is a block diagram depicting the ability to assign multiple permission list to the same application for different devices in an exemplary embodiment of the present invention. The server 500 contains the application to be used by multiple devices (device A 520 and device B 535). In this embodiment, the server generates the permission list associated with an application for a device. The server 200 may use input from multiple sources, such as the network carriers (not shown) that device A 520 and device B 535 will be connected to, device manufacturers (not shown), and the application developers (not shown). In an alternative embodiment, the permission list is generated elsewhere and stored on the server 500. In any event, a permission list is defined and indicates the resources available to an application for a specific device or class of devices, such as all devices connected to particular network).

The server 500 contains permission list A 510 and permission list B 515, for use with device A 520 and device B 535, respectively. The server 500 transmits the application 505 along with permission list A 510 to Device A 520. In one embodiment, the server uses a digital signature 525 created using application 505 and permission list A 510 information. The application 505, permission list A 510 and digital signature 525 may be evaluated by device A 520 as described with respect to FIG. 4 in order to grant application 505 access to device A's resources 545.

The server also transmits the application 505 along with permission list B 515 to Device B 535. In one embodiment, the server 500 uses a digital signature 530 created using application 505 and permission list B 515 information. The application 505, permission list B 515, and digital signature 530 may be evaluated by device B 535 as described with respect to FIG. 4 in order to grant application 505 access to device B's resources 555.

It will be recognized by those skilled in the art that permission list A 510 and permission list B 515 may have different resource access rights defined in them. If such is the case, the application 505 will have different access rights based even though it is the same application. Furthermore, these access rights are application dependent and not based on the user.

Alternatively, another embodiment of the present invention includes a single device having multiple permission lists associated with the application. Depending on a circumstance, a particular permission list may be used with an application for execution.

Conclusion

In this manner, the present invention allows for access to a device's, or multiple devices', resources based on the application being executed. The user privilege level, while impacting the access to resources across all applications the user executes, does not provide the increased granularity of resource allocation as described herein and claimed by the present invention. The present invention allows for a further refinement of granting access to resources on a per application basis, thus providing more direct control and flexibility in the device's resource management and a more secure environment for application execution.

Furthermore, the present invention allows for an authority outside of the device's control to make decisions on resource allocation based on the application and independent of the user privilege level. This is particularly useful in network environments where an application may not only impact a device, but other components connected to the network.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but one embodiment of the present invention may be implemented as a combination of hardware and software or in hardware alone. The invention may be implemented with both object-oriented and non-object-oriented programming systems. Additionally, although aspects of the present invention are described as being stored in memory, those skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM. The scope of the invention is defined by the claims and their equivalents.

What is claimed is:

1. A method for downloading and storing an application on a device, comprising the steps of:

configuring at least one processor to perform the functions of:

receiving a downloaded application at the device;

receiving a downloaded permission list associated with said downloaded application at the device, wherein the associated downloaded permission list indicates, respectively for each of a plurality of resources, on the device, which ones of said resources the device would limit the downloaded application to access on the device during continued application execution, wherein the plurality of resources is defined at the device prior to receiving the associated downloaded permission list, wherein if access is limited during the continued application execution, transmitting a request to download on update to the permission list to access the resource being limited from access for the downloaded application; and storing the downloaded application and the associated downloaded permission list on the device.

2. The method of claim 1, wherein the associated downloaded permission list is created using input from an authority.

3. The method of claim 2, wherein the authority is a separate entity from the device.

4. The method of claim 1, further comprising the steps of: executing the downloaded application on the device; and limiting the downloaded application access to the device's resources.

5. The method of claim 1, further comprising: receiving a digital signature, said digital signature being computed over at least said associated downloaded permission list.

6. The method of claim 1, wherein the device is a wireless device.

7. A wireless device comprising:
a wireless interface;
a memory for storing a control program and a plurality of applications, each application including an associated permission list;
a receiver for receiving a downloaded application at the wireless device and for receiving a downloaded permission list associated with the downloaded application at the wireless device and storing the downloaded application and the associated downloaded permission list on the wireless device;
a processor, coupled to said memory, for executing said control program and said plurality of applications; and
a plurality of device resources, coupled to said processor;
wherein said processor is configured by said control program to control access to each of said plurality of resources such that whenever the downloaded application attempts to access one of said device resources, said device resources being defined at the device prior to receiving said associated downloaded permission list, said downloaded application is limited access during continued execution if said associated downloaded permission list of said downloaded application indicates that said downloaded application is only authorized restricted access or is not authorized to access that device resource, wherein if access is limited during the continued application execution, said processor is configured to transmit a request to download an update to the permission list to access the resource being limited from access for the downloaded application.

8. The wireless device of claim 7, wherein said plurality of device resources is selected from a list comprising:
a microphone;
a speaker;
a network interface;
a dialer interface;
a file;
a location based services interface; and
an I/O port.

9. The wireless device of claim 7, wherein each application also includes a digital signature, and said processor is further configured by said control program to validate said downloaded application by evaluating said digital signature to determine whether said downloaded application and said associated downloaded permission list had been modified, and to terminate execution of said downloaded application if either said downloaded application or said associated downloaded permission list had been modified.

10. A system for downloading and storing an application on a wireless device, comprising:
means for receiving a downloaded application at the device;
means for receiving a downloaded permission list associated with said downloaded application at the device, wherein the downloaded permission list indicates, respectively for each of a plurality of resources on the device which ones of said resources the device would limit the downloaded application to access during continued execution of the downloaded application, wherein the plurality of resources is defined at the device prior to receiving the associated downloaded permission list, wherein if access is limited during the continued application execution, transmitting a request to download an update to the permission list to access the resource being limited from access for the downloaded application; and
means for storing the downloaded application and the associated downloaded permission list on 11. A computer-readable storage medium tangibly storing a sequence of computer-executable instructions, which when executed by a wireless device, causes said wireless device to control access to a plurality of device resources, for an application executing on the wireless device, comprising the steps of:
(a) receiving a downloaded application at said wireless device;
(b) receiving a downloaded permission list associated with said downloaded application at said wireless device and storing the downloaded application and the associated downloaded permission list on the wireless device;
(c) receiving, from said downloaded application, an access request for a specific device resource selected from said plurality of device resources, wherein the plurality of resources is defined at the device prior to receiving the associated download permission list;
(d) responsive to step (c), evaluating the associated downloaded permission list stored on said wireless device and associated with said downloaded application, wherein the associated downloaded permission list indicates restrictions on which ones of said device resources the downloaded application can access; and
(e) limiting said downloaded application access to the specific device resource while continuing to execute the downloaded application when said associated downloaded permission list indicates that said downloaded application contains restrictions from accessing said specific device resource, wherein if access is limited during the continued application execution, transmitting a request to download an update to the permission list to access the resource being limited from access for the downloaded application.

* * * * *